No. 792,581. PATENTED JUNE 20, 1905.
W. E. BOCK.
MACHINE FOR FORMING PARISONS FOR GLASS BLOWING.
APPLICATION FILED DEC. 15, 1900.
2 SHEETS—SHEET 1.
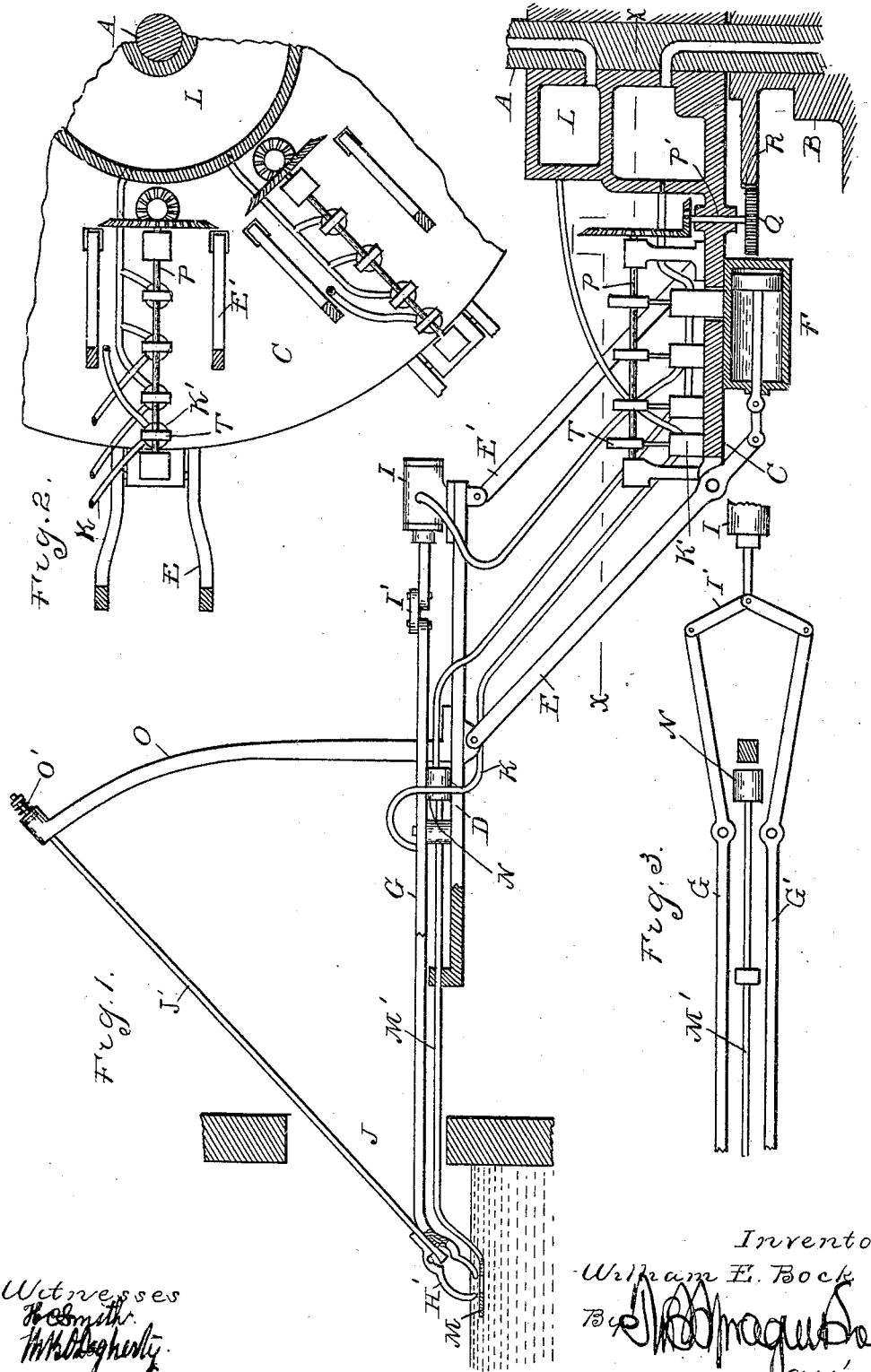
Witnesses
Inventor
William E. Bock
attys.

No. 792,581. PATENTED JUNE 20, 1905.
W. E. BOCK.
MACHINE FOR FORMING PARISONS FOR GLASS BLOWING.
APPLICATION FILED DEC. 15, 1900.
2 SHEETS—SHEET 2.
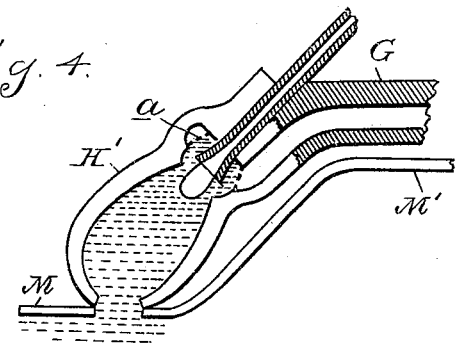
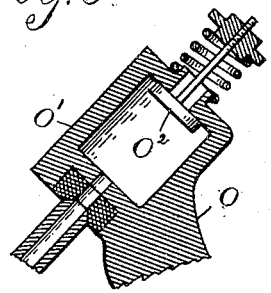
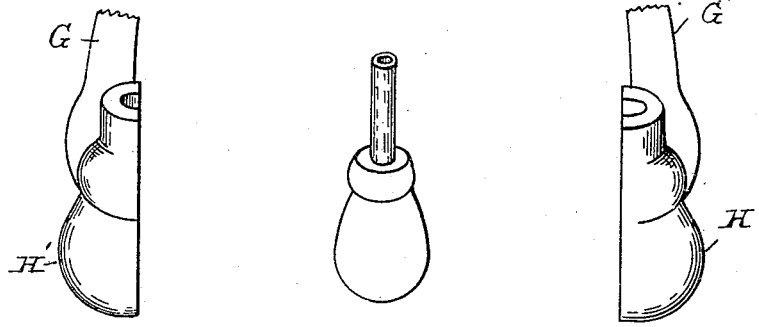
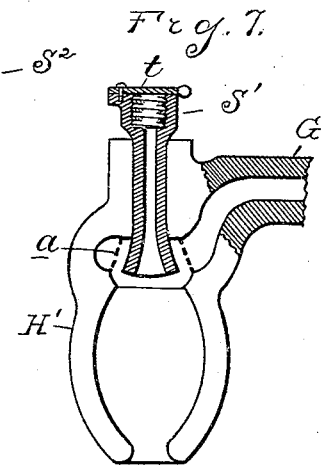
Witnesses
H. C. Smith.
H. B. Dougherty.
Inventor
William E. Bock
By ... Attys.

No. 792,581. Patented June 20, 1905.

UNITED STATES PATENT OFFICE.

WILLIAM E. BOCK, OF TOLEDO, OHIO, ASSIGNOR TO THE TOLEDO GLASS COMPANY, OF TOLEDO, OHIO, A CORPORATION OF OHIO.

MACHINE FOR FORMING PARISONS FOR GLASS-BLOWING.

SPECIFICATION forming part of Letters Patent No. 792,581, dated June 20, 1905.

Application filed December 15, 1900. Serial No. 40,006.

*To all whom it may concern:*

Be it known that I, WILLIAM E. BOCK, a citizen of the United States, residing at Toledo, in the county of Lucas and State of Ohio, have invented certain new and useful Improvements in Machines for Forming Parisons for Glass-Blowing, of which the following is a specification, reference being had therein to the accompanying drawings.

The invention relates to glass-blowing machines, and more particularly to a machine for gathering the glass and forming the parison preparatory to the blowing operation.

The invention consists in the means employed for forming and attaching the parison to the blowing-nozzle, comprising the peculiar construction of parison-mold and its arrangement in relation to the blowing-nozzle; further, in the means for filling said mold; further, in the means employed for forming in the parison the initial cavity for blowing, and, further, in the peculiar construction, arrangement, and combination of parts, as hereinafter described and claimed.

In the drawings, Figure 1 is a sectional side elevation of a portion of the machine. Fig. 2 is a horizontal section on line $x\,x$, Fig. 1. Fig. 3 is a plan of the mold and operating-levers. Fig. 4 is an enlarged section through the mold as during the operation of filling the same. Fig. 5 is a section through the cap and valve. Fig. 6 is a plan showing the mold-sections open to remove the blowpipe and parison, and Fig. 7 is a section illustrating a modification.

Described in general terms, the machine comprises a sectional mold for forming the parison, which is provided with means for detachably supporting the blowing-nozzle to project therein, also means for filling said mold to form the parison and attach it to said nozzle, whereby upon the opening of said sectional mold said nozzle and attached parison may be removed. The means preferably employed for filling the mold comprises an air-suction device, which is connected with the cavity within said mold. The machine is also preferably provided with mechanism for inserting the parison-mold in the furnace and dipping it into the molten glass, together with means for subsequently withdrawing said mold, cutting off the adhering string of glass, and for opening the sections of the mold to permit of removing the parison and blowing-nozzle.

In the construction shown in the drawings, A is a revoluble vertical shaft journaled in suitable bearings in the frame B. Upon the shaft is mounted a head C, to which are secured a series of radial extensible arms D. These arms are preferably secured to the head by means of the pivotal parallel links E E', one of which has an actuating connection with a pneumatic motor F, secured to the head C. To each of the arms D are pivotally secured a pair of arms G G', which extend forwardly and carry at their free ends the half-sections H H' of the parison-mold. This mold is of a shape and size suitable for forming the parison for the particular article to be blown and is also constructed to form a detachable support for the blowing-nozzle. The latter is arranged to project slightly within the cavity of the mold, so that when said mold is filled the glass will be drawn around the nozzle and attached thereto. As shown in Fig. 1 of the drawings, the blowing-nozzle used is an ordinary glass-blower's blowpipe J', and in order to more readily insert said mold and blowpipe into the furnace they are arranged on an incline. Where a short blowing-nozzle is used, as shown in Fig. 7, this incline arrangement may be dispensed with and the axis of the mold may be arranged in a vertical line.

The arms G G' are provided with means for moving them toward or away from each other to open or close the mold-sections H H'. This is shown as comprising a pneumatic motor I, secured to the arm or plate D and having a toggle-lever connection I' with the arms G G'.

With the arrangement as thus far described the rotation of the shaft A will cause the arms or plates D to be successively brought into alinement with the aperture J in the furnace, whereupon the pneumatic motor F will be operated to swing the links E E' and to project said arm D, together with the arms G G' and the mold-sections H H', into the furnace through the opening J and to dip the end of said mold into the molten glass. In order to fill the mold, a suction-pipe is connected thereto, which, as shown, is formed in one of the arms G and is connected by a flexible connection K to the controlling-valve K', which is connected to the exhaust-chamber L, supported by the head C. This suction-pipe connects with an annular passage in the mold-sections, preferably covered with a screen *a*, which will permit of the passage of air therethrough, but will prevent the glass from being drawn into the suction-pipe. The lower end of the mold is provided with an orifice through which the molten glass may enter, and registering with this orifice is an apertured slide or cut-off M. This slide is carried by the arm M', slidingly secured in bearings upon the arm or plate D, and connected with a pneumatic motor N for operating the same.

In order to prevent the air from rushing into the mold through the blowing-nozzle whenever the suction is applied, and thereby preventing the filling of the mold, the upper end of said nozzle must be closed or restricted. In Fig. 1 the arm O is shown as extending upward from the arm or plate D and having a cap O' bearing against the upper end of the blowpipe. This cap is chambered and contains the spring-closed valve $O^2$, controlling the upper end of the cap, whereby air can only be admitted to the blowpipe when there is sufficient suction to overcome the tension of the spring.

The valves controlling the pneumatic motors I, N, and F are preferably connected thereto by flexible connections and are arranged upon the head C, being operated in timed relation to each other by suitable mechanism. This I have shown as comprising the shaft P, having a series of cams thereon for respectively operating said valves, said shaft being driven from a shaft P' through the engagement of the pinion Q with a stationary segmental rack R.

The construction being as shown and described, the operation is as follows: The operator first places the blowpipe or nozzle with its upper end in engagement with the cap O' and its lower end in position to be clamped by the mold-sections H H'. The pneumatic motor I is then operated to close the mold-sections and hold the blowpipe in position, after which the rotation of the shaft A will carry said blowpipe opposite the opening J in the furnace. The motor F will then be brought into action to swing the links E, and thereby move the arm D downward. This will cause the arms G G' and the mold to be thrust in the opening J and dipped into the molten glass in the furnace. The cam T on the shaft P, controlling the exhaust-valve K', is then operated, which will exhaust the air in the conduit K and mold-chamber, causing the glass to be drawn up to fill said chamber and to surround the end of the blowpipe. The glass is prevented from passing into the exhaust-conduit by the perforated screen *a*, the apertures of which are too fine for the glass to pass through. During or subsequent to the filling of the mold a small current of air will be admitted through the cap O' by the opening of the valve $O^2$ against the tension of its spring. This air-current will pass through the blowpipe into the mold and will form a small cavity in the glass at the mouth of the blowpipe. When the mold is filled, the motor F will be operated in the reverse direction, which will withdraw the mold and the arms G G' from the furnace by retracting the arm D. As the mold is being lifted from the molten glass and withdrawn from the furnace the motor N will be operated to move the cut-off slide longitudinally, thereby cutting off the adhering string of glass. When in the rotation of the shaft A the blowpipe is carried beyond the opening in the furnace, the motor I will again be operated to open the mold-sections and permit of removing the blowpipe and attached parison. The blowpipe may then be carried to the point of blowing, which may be accomplished either by machine or by the workman.

In Fig. 7 a modification is shown in which the blowpipe is provided with a detachable nozzle S'. During the operation of forming the parison this nozzle alone is supported in the mold, and after the latter has been filled and withdrawn from the furnace the stem $S^2$ may be coupled with said nozzle to be used by the workman in blowing. With this construction the opening through the nozzle must be closed while the air is being exhausted, and for this purpose any kind of a plug may be used, or I may hinge a plate *t* on the upper end of the nozzle, which may be turned to cover or uncover the opening in the nozzle.

When I employ the word "blowpipe" in the claims, I mean either a blower's pipe or a nozzle.

What I claim as my invention is—

1. The combination with a blowing-nozzle, of a parison-mold having means for detachably supporting said nozzle to project therein, and means for filling the mold directly from a mass of molten metal around the nozzle and thereby attaching the glass to said nozzle whereby upon the removal of the latter the formed parison will be carried thereby.

2. The combination of a sectional parison-mold, a blowing-nozzle detachably supported to project within said mold, means for filling the mold around the nozzle and thereby attaching the glass to said nozzle and means for opening the mold to remove said nozzle and attached parison.

3. The combination with a blowing-nozzle, of a parison-mold having means for detachably supporting said nozzle to project therein, and means for applying suction to fill said mold with the molton glass and to form the central cavity at the mouth of said nozzle, by air admitted through the latter.

4. The combination with a blowing-nozzle, of a parison-mold having means for detachably supporting said nozzle to project therein, means for applying suction to fill said mold with molten glass, and means for restricting the air-inlet to said nozzle, whereby a small quantity of air only will be admitted therein to form the initial blowing-cavity within the parison.

5. The combination of a parison-mold, a carrying-arm for dipping said mold into the molten glass and then removing the same, a blowing-nozzle detachably supported within said mold and adapted to be carried therewith, means for exhausting the air from said mold when dipped into the glass to fill the same and for admitting air through said nozzle to form the initial cavity for blowing and means for opening said mold to remove said nozzle and parison.

6. The combination of a parison-mold, a nozzle detachably projecting therein, means for filling the mold while the nozzle is therein, and for connecting the blank to the nozzle.

7. The combination with a tank or pot of molten metal, of a gathering-machine arranged adjacent thereto, comprising an open-bottom mold, an extensible support for the mold, adapted to project it into the molten glass and to withdraw it therefrom and means for forcing the glass up into the mold.

8. A gathering-machine comprising a detachable blowpipe or nozzle a gathering-mold about the end thereof, means for moving the same into proximity to a mass of molten glass, and means for gathering a measured quantity of glass about said blowpipe or nozzle, and for distributing it evenly about the same.

9. In a glass-machine, a movable arm, a parison-mold supported thereon, a blowpipe also adapted to be supported thereon with its end projecting into the mold, an air-exhaust device connecting into the mold, and a cut-off for the fill-opening of the mold.

10. In a glass-machine, a movable arm, a parison-mold projecting downward from the outer end thereof, a detachable blowpipe supported with its end projecting into the mold, and extending at an acute angle to the movable arm, whereby the mold and blowpipe may be extended through the eye of a furnace into the glass therein.

11. In a glass-machine, a movable arm, a sectional parison-mold at the end thereof, means for moving the arm to carry the mold to and from a pot of molten glass, a blowpipe supported with its end projecting into the mold, means for opening and closing the mold, and means for exhausting the air therefrom when in operative relation to the molten glass.

12. In a glass-gathering machine, the combination of a sectional mold, an extensible arm carrying the same, means for exhausting the air from the mold and a cut-off device for the fill-opening of the mold carried by the arm.

13. In a glass-gathering machine, the combination of a sectional mold, an extensible arm carrying the same, a motor for extending the arm, a cutting-off device for the fill-opening of the mold, carried on the arm, a motor for actuating the same means for exhausting the air from the mold, and a controlling device therefor.

14. A detachable blowpipe and means for gathering and simultaneously shaping and distributing a blank upon the blowpipe-nozzle.

15. In a gathering-machine, the combination of a blowpipe and a blowpipe-support, a gathering-mold inclosing the nozzle thereof, and means for filling the glass into the mold directly from a mass of molten glass around the blowpipe.

16. A gathering-machine comprising a detachable blowpipe and a blank-forming mold, so combined that the glass may be filled into the mold around the blowpipe and means for filling the mold with glass.

17. In a gathering-machine, the combination of a movable sectional parison-mold, a detachable blowpipe supported so as to project within the mold and means for exhausting the air in the mold.

18. In a gathering-machine, the combination of a movable sectional parison-mold having a fill-opening, a detachable blowpipe supported so as to project within the mold, and means for exhausting the air from the mold whereby it may be filled through the fill-opening.

19. In a gathering-machine, the combination of a sectional parison-mold having a fill-opening, a detachable blowpipe supported so as to project within the mold, means for exhausting the air from the mold and means for moving the mold to and from a mass of molten glass.

20. In a gathering-machine, a mold, a blowpipe having its end therein, and means for gathering and attaching a measured quantity of glass thereto.

21. In a gathering-machine, a mold, a blowpipe having its end therein, means for gathering and attaching a measured quantity of glass thereto, and for shaping the gather into a blowing-blank.

22. In a gathering-machine, a mold, a blowpipe having its end therein, means for gathering a measured quantity of glass, from a molten mass, attaching it to the blowpipe and simultaneously shaping it into a blank.

In testimony whereof I affix my signature in presence of two witnesses.

WILLIAM E. BOCK.

Witnesses:
F. D. SUYDAM, Jr.,
MARTHA J. DOYLE.